(12) United States Patent
Abinanti

(10) Patent No.: US 7,107,940 B2
(45) Date of Patent: Sep. 19, 2006

(54) ANIMAL RESTRAINING APPARATUS

(76) Inventor: T. Michael Abinanti, 266 Park Dr., Palatine, IL (US) 60067

( * ) Notice: Subject to any disclaimer, the term of this patent is extended or adjusted under 35 U.S.C. 154(b) by 0 days.

(21) Appl. No.: 10/902,501

(22) Filed: Jul. 29, 2004

(65) Prior Publication Data

US 2006/0021584 A1 Feb. 2, 2006

(51) Int. Cl.
*A01K 27/00* (2006.01)

(52) U.S. Cl. ...................... 119/792; 119/858

(58) Field of Classification Search ............... 119/792, 119/793, 795, 797, 798, 769, 856, 857, 858, 119/863, 864; 24/115 R, 182; 54/23; 2/338, 2/315, 316, 317, 342, 318, 319, 320, 321, 2/322, 341

See application file for complete search history.

(56) References Cited

U.S. PATENT DOCUMENTS

| | | | | | |
|---|---|---|---|---|---|
| 600,478 | A | * | 3/1898 | Cottier ..................... | 24/182 |
| 2,252,257 | A | * | 8/1941 | Harvey ..................... | 54/1 |
| 2,453,010 | A | * | 11/1948 | Grafiln ...................... | 119/864 |
| 2,826,172 | A | * | 3/1958 | Buckle et al. .............. | 119/792 |
| 3,978,820 | A | * | 9/1976 | Drehman ................... | 119/654 |
| 4,022,161 | A | * | 5/1977 | Halperin .................... | 119/793 |
| 4,141,322 | A | * | 2/1979 | Evans et al. ............... | 119/654 |
| 4,266,511 | A | * | 5/1981 | Muench ..................... | 119/858 |
| 4,964,369 | A | * | 10/1990 | Sporn ........................ | 119/864 |
| 5,146,876 | A | * | 9/1992 | McPhail .................... | 119/798 |
| 5,178,163 | A | * | 1/1993 | Yewer, Jr. .................. | 128/876 |
| 5,269,050 | A | * | 12/1993 | Yewer, Jr. .................. | 24/170 |
| 5,383,426 | A | * | 1/1995 | Krauss ...................... | 119/793 |
| 5,388,274 | A | * | 2/1995 | Glover et al. .............. | 2/338 |
| 5,421,809 | A | * | 6/1995 | Rise ........................... | 602/19 |
| 5,426,924 | A | * | 6/1995 | Harty ......................... | 54/23 |
| 5,511,515 | A | * | 4/1996 | Brown et al. .............. | 119/771 |
| 5,566,533 | A | * | 10/1996 | Larisch ...................... | 54/23 |
| 5,586,969 | A | * | 12/1996 | Yewer, Jr. .................. | 602/19 |
| 5,647,824 | A | * | 7/1997 | Levenson ................... | 482/92 |
| 5,682,840 | A | * | 11/1997 | McFarland ................. | 119/856 |
| 5,768,864 | A | * | 6/1998 | Chang ........................ | 54/23 |
| 5,791,295 | A | * | 8/1998 | Schmid et al. ............. | 119/793 |
| 5,794,571 | A | * | 8/1998 | Goldberg ................... | 119/792 |
| 5,893,339 | A | * | 4/1999 | Liu ............................. | 119/792 |
| 5,950,569 | A | * | 9/1999 | Perrulli ...................... | 119/770 |
| 6,016,617 | A | * | 1/2000 | Adler ......................... | 40/303 |
| 6,076,339 | A | * | 6/2000 | Chang ........................ | 54/23 |
| 6,125,793 | A | * | 10/2000 | Petty .......................... | 119/856 |
| 6,161,505 | A | * | 12/2000 | Noguero .................... | 119/792 |
| 6,164,048 | A | * | 12/2000 | Rhodes ...................... | 54/1 |
| 6,167,844 | B1 | * | 1/2001 | Cantrell et al. ............ | 119/856 |
| 6,220,003 | B1 | * | 4/2001 | Hung ......................... | 54/23 |
| 6,314,915 | B1 | * | 11/2001 | Pope et al. ................. | 119/712 |
| 6,334,409 | B1 | * | 1/2002 | Stein et al. ................. | 119/858 |
| 6,340,001 | B1 | * | 1/2002 | Hendrie ..................... | 119/792 |
| 6,401,666 | B1 | * | 6/2002 | Kircher ...................... | 119/792 |
| 6,449,815 | B1 | * | 9/2002 | Spiller ........................ | 24/306 |

(Continued)

*Primary Examiner*—Yvonne R. Abbott
(74) *Attorney, Agent, or Firm*—Pauley Petersen & Erickson

(57) ABSTRACT

An animal restraining apparatus having a belt which forms an opening. A girth of an animal is positioned within the opening. The belt is constricted around the girth of the animal by forcing opposite free end portions of a line apart from each other. A guide element maintains a position of the line with respect to the belt. The line is moveably mounted with respect to the belt. A keeper element can be used to maintain the free end portions of the line in a desired position. Preferably but not necessarily, the free end portions overlap each other near the keeper element.

19 Claims, 5 Drawing Sheets

U.S. PATENT DOCUMENTS

| | | |
|---|---|---|
| 6,513,460 B1 * | 2/2003 | Fountoulakis ............... 119/770 |
| 6,553,944 B1 * | 4/2003 | Allen et al. ................. 119/769 |
| 6,564,754 B1 * | 5/2003 | Cohen ........................ 119/856 |
| 6,679,198 B1 * | 1/2004 | LaGarde ..................... 119/792 |
| 6,681,513 B1 * | 1/2004 | Hill ................................. 43/4 |
| 2003/0000183 A1 * | 1/2003 | Foerderer ..................... 54/23 |

* cited by examiner

ANIMAL RESTRAINING APPARATUS

BACKGROUND OF THE INVENTION

1. Field of the Invention

This invention relates to an apparatus for restraining an animal, such as a dog, that can be used in combination with a conventional collar.

2. Discussion of Related Art

Many different conventional collars are used to restrain a dog or other household animal when training and/or exercising the animal. Conventional collars are adjustable, for example with a buckle, with a hook-and-loop strap or any other suitable adjustable fastener. Other conventional collars include a choke chain.

During training or exercise, a leash is attached to the conventional collar. When the leash is pulled, the collar restrains the animal. However, many conventional collars choke or otherwise apply undesirable forces to a neck portion of the animal. It is apparent that there is a need for an animal restraining device that causes less harm and/or irritation to the animal, particularly to the neck area of the animal.

SUMMARY OF THE INVENTION

It is one object of this invention to provide an animal restraining device that is less harmful to an animal being trained or exercised.

The above and other objects of this invention are accomplished with an animal restraining apparatus having a belt that can be closed so that it forms a void or an opening. A guide element is either connected to the belt or is formed by the belt. A line, such as a rope, a cord, a belt, a band, a chain and/or wire, is moveably mounted with respect to the belt. In one embodiment, the line is slidably mounted within a channel formed between the belt and the guide element.

The guide element maintains a position of the line with respect to the belt. In one embodiment of this invention, opposite free end portions of the line are directed outward from the guide element. A keeper element can be attached with respect to the belt. In one embodiment of this invention, the free end portions are routed through the keeper element.

Preferably but not necessarily, the line is overlapped near the keeper element. When overlapped, the opposite free end portions can be directed away from each other to close the belt and thus reduce the size of the opening. In one embodiment of this invention, the belt can be positioned about a stomach area or other body portion of the animal.

One free end portion of the line is directed and attached to a conventional collar that fits around the neck of the animal. The other free end portion is directed away from the collar. In one embodiment of this invention, the other free end portion can be connected or attached to a leash.

When the leash is pulled and the other free end portion is directed away from the belt, the length of the belt portion which is within the channel between the guide element and the belt decreases and thus reduces the size of the opening. The reduced opening size fits tighter around a stomach area of the animal and thus tightens the belt about the body of the animal.

When the force on the leash is released, the length of the belt portion within the channel increases and thus increases the size of the opening and relieves pressure on the body of the animal.

The animal restraining apparatus of this invention can be used for exercising and/or training a dog or other animal. During either activity, the keeper element can be positioned near a back portion of the body of the animal. In this situation, the leash is directed over the back portion of the body, over the tail portion and away from the animal. Also during either activity the keeper element can be positioned near the bottom stomach portion of the animal. In this situation, the other free end portion is directed between the rear legs of the animal and away from the body of the animal.

The animal restraining apparatus of this invention reduces undesirable forces applied to the neck area of the animal. The animal restraining apparatus of this invention reduces pulling forces applied to a conventional collar. Also, the animal restraining apparatus of this invention prevents the leash from being tangled within the legs of the animal, for example when the animal is running with an unattended leash.

BRIEF DESCRIPTION OF THE DRAWINGS

The above-described and other features of this invention are discussed in the specification and can be better understood when read in view of the drawings, wherein.

DESCRIPTION OF PREFERRED EMBODIMENTS

Figure 1:
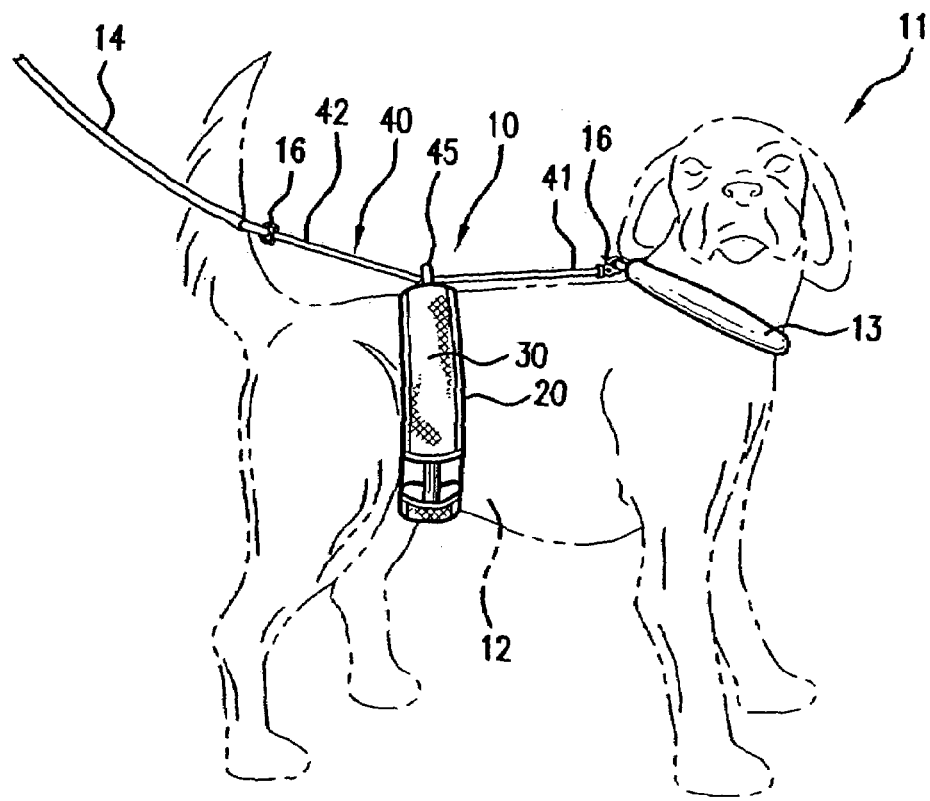
FIG. 1 is a schematic diagram showing an animal restraining apparatus attached to a dog.
Figure 2:
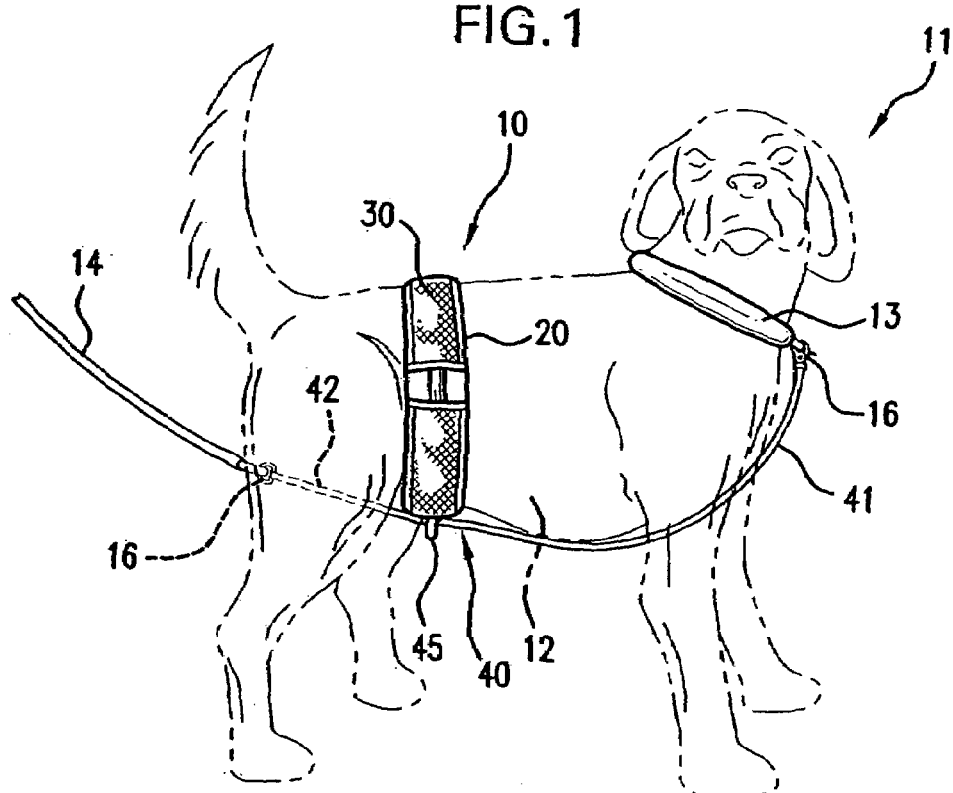
FIG. 2 is a schematic diagram showing another embodiment of an animal restraining apparatus attached to a dog.

FIGS. 1 and 2 show animal restraining apparatus 10 positioned on animal 11, such as a dog, and acting as a cincture positioned about girth 12 of animal 11.

Figure 7A:
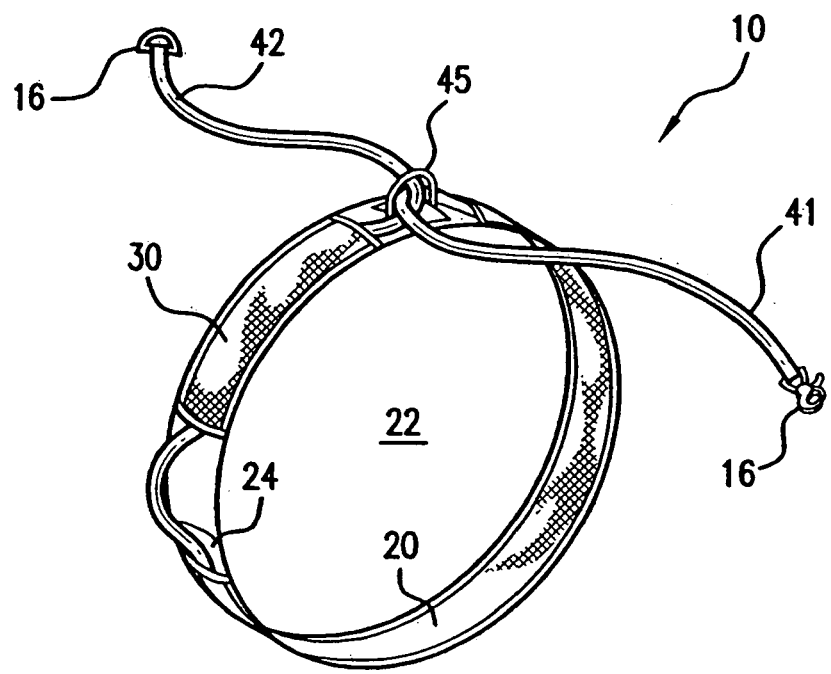
FIG. 7A is a perspective view showing an animal restraining apparatus with opposite free end portions of a line in a relaxed condition.
Figure 7B:
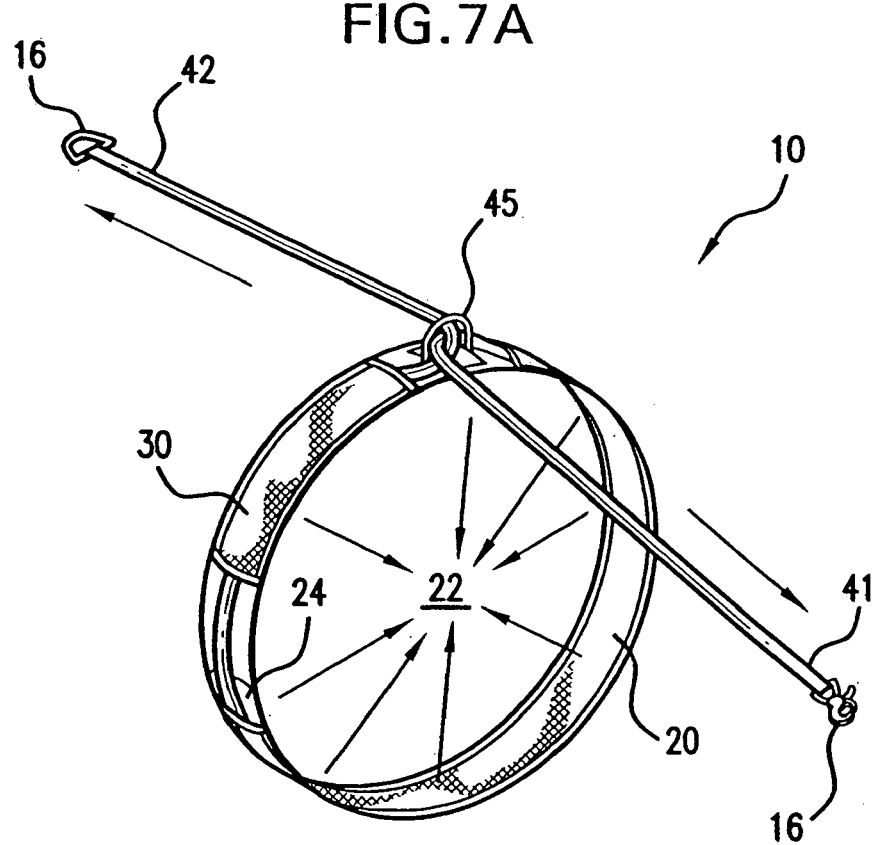
FIG. 7B is a perspective view of an animal restraining apparatus, as shown in FIG. 7A, but with the opposite free end portions of the line directed away from each other, in a taut condition.

FIGS. 5, 7A, 7B and 8 show belt 20 forming a void or opening 22. FIGS. 1 and 2 show girth 12 of animal 11 positioned within opening 22. Opposing free end portions 41 and 42 of line 40 are pulled in opposite directions to reduce the size of opening 22, such as shown in FIG. 7B. As belt 20 tightens about girth 12 of animal 11, the constricting movement grabs the attention of and thus restrains animal 11.

Belt 20 can be positioned at various suitable locations along the body of animal 11. FIGS. 1 and 2 show one preferred position of belt 20 with respect to animal 11, where belt 20 is slightly forward of the front portion of the two rear legs of animal 11.

FIG. 1 shows belt 20 positioned so that keeper element 45 points upward. In this position, free end portion 42 of line 40 and/or leash 14 is routed over the back portion of animal 11, preferably but not necessarily over the tail portion of animal 11, as shown in FIG. 1.

FIG. 2 shows keeper element 45 positioned downward, so that keeper element 45 is near the stomach portion of animal 11. In such position, free end portion 42 of line 40 is routed rearward between the rear legs of animal 11.

Regardless of the position of belt 20 with respect to the back portion and/or the stomach portion of animal 11, keeper element 45 acts as a guide for directing free end portion 42 and/or free and portion 41 of line 40. The guiding function of keeper element 45 helps maintain the general position of leash 14 and/or end portion 42. Because belt 20 and thus keeper element 45 is maintained at a rearward portion of animal 11, regardless of the direction in which a forward portion of animal 11 moves, leash 14 and/or end portion 42, with keeper element 45, maintains a general position of leash 14 and/or free end portion 42 routed over the back portion or the stomach portion of animal 11.

As shown in FIGS. 1 and 2, free end portion 41 of line 40 is attached, such as detachably attached, or connected to collar 13. As shown in FIG. 1, the attachment to collar 13 is near a rear neck portion of animal 11. As shown in FIG. 2, free end portion 41 of line 40 is connected or attached to collar 13 which is in a downward position on the neck of animal 11.

During use, when leash 14 is pulled away from animal 11, free end portion 42 of line 40 moves in an opposite direction with respect to free end portion 41 of line 40. During such movement, belt 20 constricts and thus reduces the area of opening 22. Such movement restrains animal 11. When the force pulling leash 14 is released or reduced, free end portions 41 and 42 move towards each other and increase the peripheral length of belt 20. This movement eases the forces acting to restrain animal 11.

In another embodiment of this invention, free end portion 41, such as shown in FIG. 1, can be directly connected or attached with respect to belt 20. For example, as shown in FIG. 1, the rearward portion of free end portion 41 can be connected to or attached to belt 20, guide element 30 and/or keeper element 45. Free end portion 41 can be connected to or attached to a fastener that can be fixedly or detachably connected to belt 20, guide element 30 and/or keeper element 45. In such embodiment, fee end portion 41 has a fixed length which can be designed to limit the travel distance that belt 20 moves away from or with respect to collar 13. In use, a significant portion of the pulling force exerted by leash 14 is directed to belt 20 and a significant portion of the pulling force is not directed to collar 13. Thus, in such embodiment, collar 13 acts as a device that maintains the position of belt 20 with respect to the body of animal 11. In such embodiment where free end portion 41 acts as a fixed link, one end of free end portion 41 can be attached to any suitable location about belt 20 and/or guide element 30.

Figure 3:
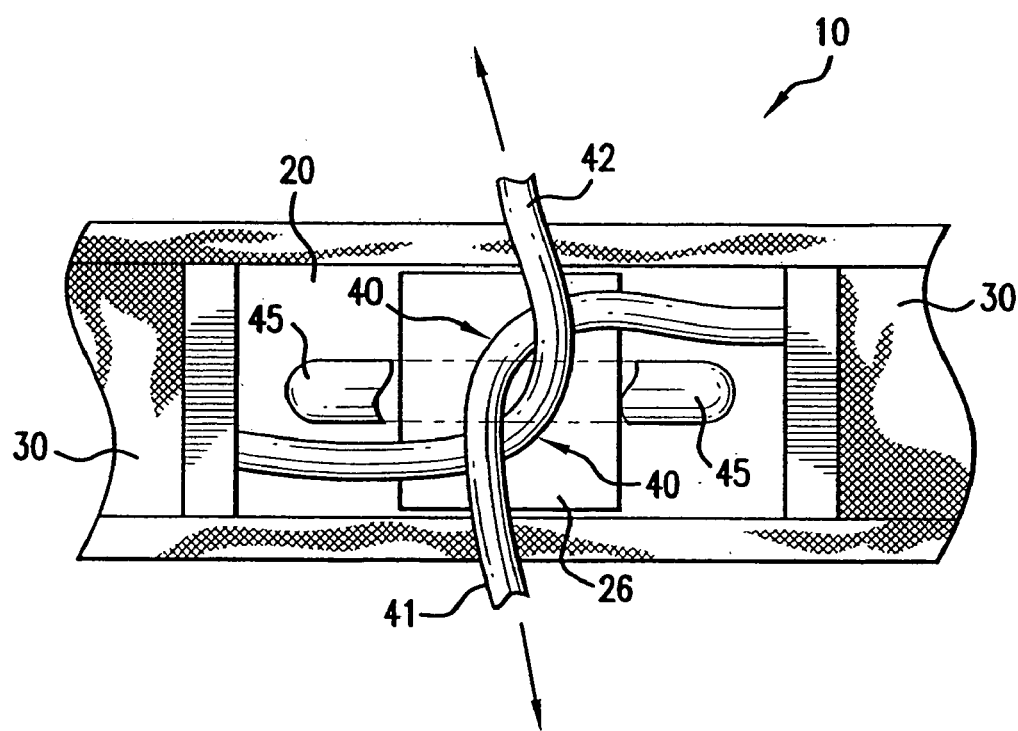
FIG. 3 is a top view of a portion of a belt, a guide element and opposite free end portions of a line, according to one embodiment of this invention.
Figure 4:
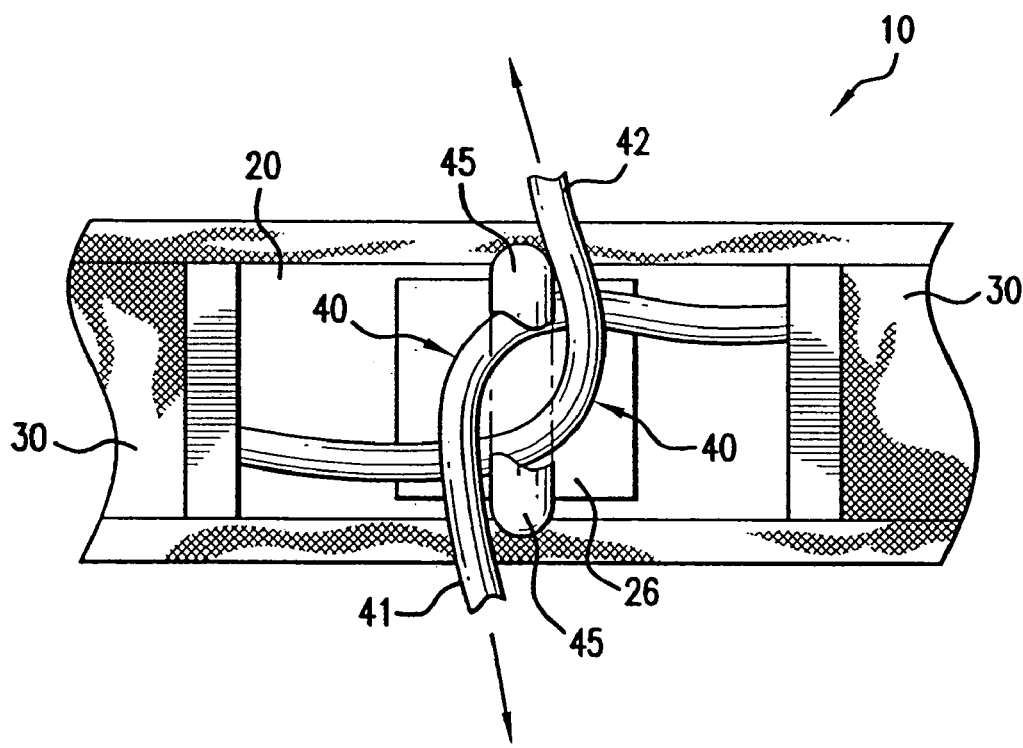
FIG. 4 is top view of a portion of a belt, a guide element and opposite free end portions of a line, according to another embodiment of this invention.
Figure 5:
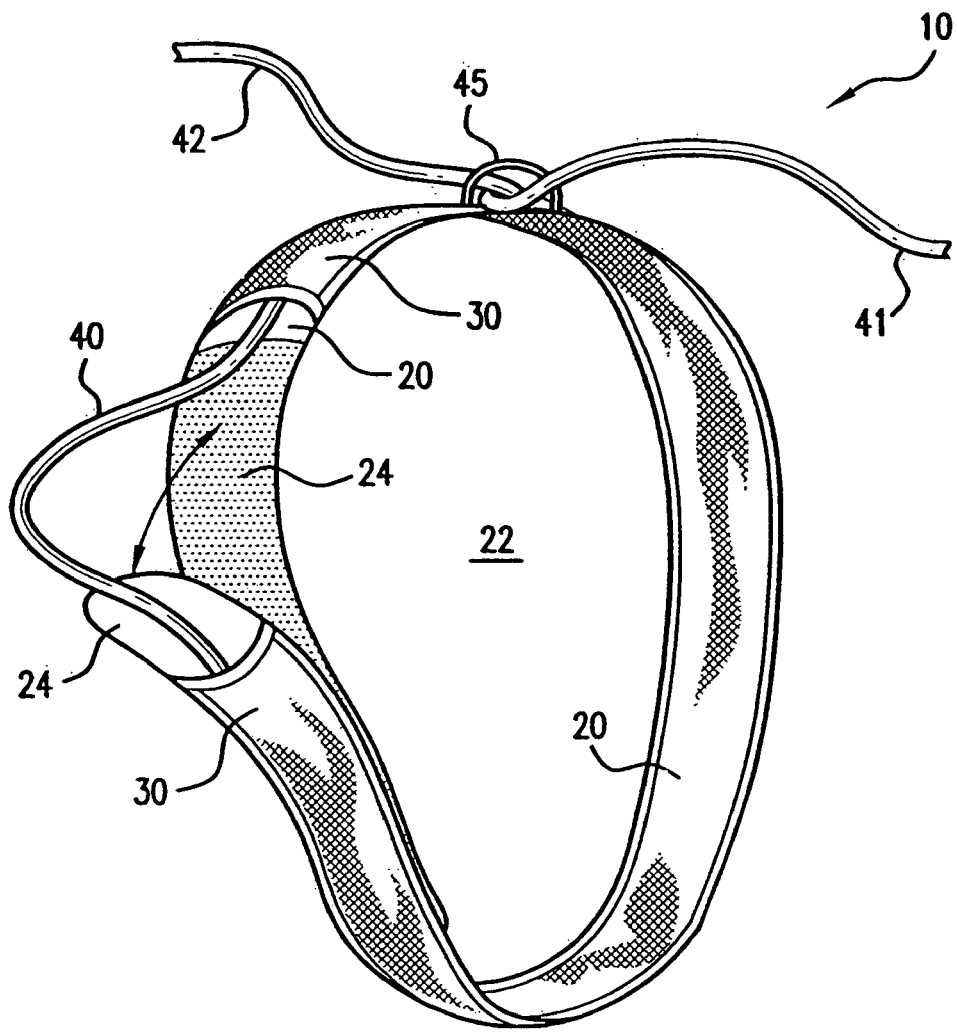
FIG. 5 is a perspective view of an animal restraining apparatus, according to one embodiment of this invention.
Figure 6:
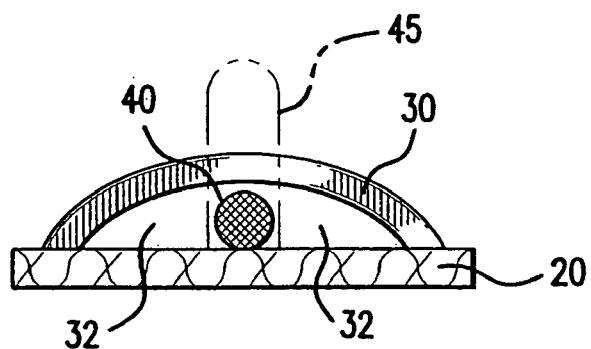
FIG. 6 is a cross-sectional view of a section of the belt near the keeper element, according to one embodiment of this invention.

Guide element 30 can be connected to or integrally formed with or by belt 20. Any suitable sewn, adhesive or other suitable connection can be used to secure guide element 30 with respect to belt 20. As shown in FIGS. 3–5, for example, guide element 30 comprises pieces of fabric sewn or otherwise attached to belt 20. FIG. 6 shows channel 32 formed between belt 20 and guide element 30. FIG. 6 also shows line 40 fitting relatively loosely within channel 32. A relatively loose fit within channel 32 allows line 40 to move or slide easily with respect to belt 20.

As shown in the drawings, line 40 is of a rope or cord. However, in other embodiments, line 40 may also be a band, a chain, a wire or any other suitable elongated member that can be routed within channel 32 and connected to collar 13 and/or leash 14. Different materials can be used to construct line 40, which may depend upon a desired coefficient of friction between line 40 and belt 20 and/or guide element 30.

Guide element 30 preferably maintains a position of line 40 with respect to belt 20. Belt 20 is preferably used to comfort animal 11 when animal restraining apparatus 10 is operated according to this invention.

Figure 8:
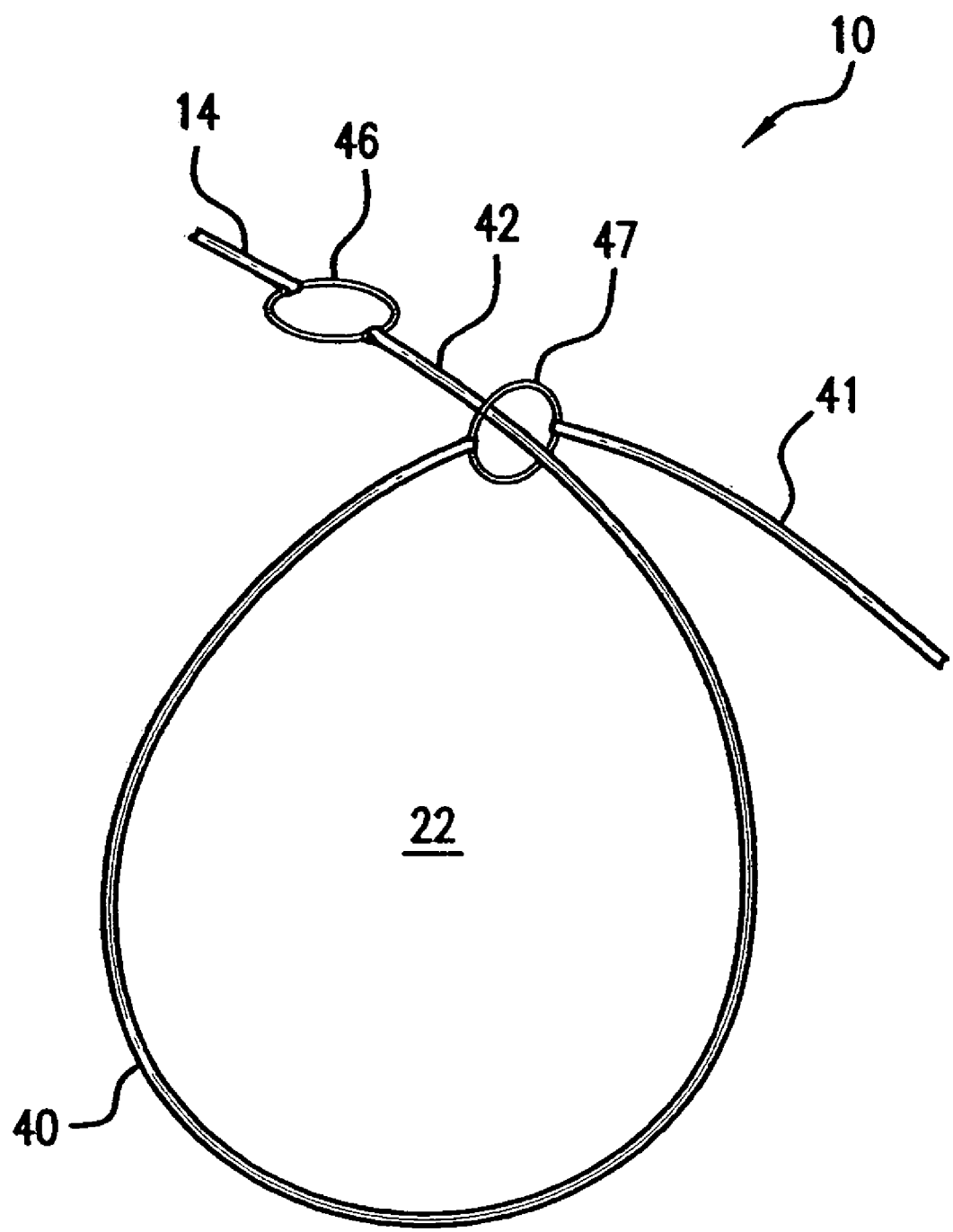
FIG. 8 is a perspective view of an animal restraining apparatus, according to another embodiment of this invention.

In one other embodiment of this invention, belt 20 and guide element 30 can be replaced by a conventional choke chain having line 40 as a chain or other flexible member positioned between two rings 46 and 47. Free end portions 41 and 42 of line 40 can be attached, one to each of the two rings 46 and 47 of the choke chain. FIG. 8 shows how a conventional choke chain can be attached with respect to leash 14 and/or free end portion 41, particularly to act in combination with collar 13. FIG. 8 shows free end portion 41 attached directly to ring 47, but free end portion 41 can also be routed through ring 47. However, this particular embodiment may cause more discomfort to animal 11 when animal restraining apparatus 10 is operated.

As shown in FIGS. 3 and 4, keeper element 45 can be attached with respect to belt 20, in different directions. Although keeper element 45 is shown in FIGS. 3 and 4 as being attached with respect to belt 20 by sewing or otherwise attaching patch 26 to belt 20, any other suitable connection can be used. Keeper element 45 can be a ring, as shown in the drawings, or can be any other suitable mechanical structure that allows free end portions 41 and 42 to be routed through keeper element 45 and also to be overlapped with respect to each other.

FIGS. 3 and 4 show free end portions 41 and 42 directed outward of guide element 30 and then overlapped with each other near keeper element 45. In this particular embodiment, the opening and closing action of belt 20 and thus the increasing and decreasing, respectively, size of opening 22 occurs easier and with reduced twisting of animal restraining apparatus 10 with respect to animal 11. When free end portions 41 and 42 are not overlapped with respect to each other, belt 20 tends to twist with respect to girth 12 of animal 11.

As shown in FIG. 5, belt 20 forms a loop. FIG. 5 also shows hook-and-loop fastener 24 used to releaseably attach one end portion of belt 20 with respect to another end portion of belt 20. With animal restraining apparatus 10 in a condition as shown in FIG. 5, belt 20 along with line 40 can be slipped over two legs, either front or back, of a four-legged animal. Once animal restraining apparatus 10 is mounted, such as a cincture, on animal 11, hook-and-loop fastener 24 or another suitable fastener can be used to adjustably tighten belt 20 about girth 12 of animal 11. In other embodiments of this invention, any other suitable end fastening or connecting device can be used to adjustably secure opposing end portions of belt 20 with respect to each other. Also, it is possible to use an elastic belt 20 in combination with or in lieu of belt 20 and/or guide element 30.

As animal restraining apparatus 10 is operated by directing free end portions 41 and 42 apart from each other, a peripheral length of belt 20 can be varied, such as reduced.

FIGS. 7A and 7B show that guide element 30 can be intermittently positioned along a periphery of belt 20. As shown in FIG. 5, guide element 30 can also be continuously positioned along the periphery of belt 20.

As shown in FIGS. 1, 2, 7A and 7B, free end portion 41 and/or free end portion 42 can be connected or attached to connector 16. Connector 16 can be a clasp, a ring or any other suitable connecting device. As shown in FIGS. 1 and 2, end portion 41 is connected with respect to collar 13.

The different elements of this invention can be made from the same or different suitable materials, depending upon the desired strength and/or style of animal restraining apparatus 10.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. An animal restraining apparatus comprising:
   a collar positionable around a neck portion of an animal, a belt forming an opening, said belt positionable around a girth of the animal, a line having opposite free end portions and movably mounted with respect to said belt, one of said free end portions connected to said collar, a guide element at least one of connected to said belt and formed by said belt, said guide element maintaining a position of said line with respect to said belt, a keeper element attached to said belt, and opposite free end portions of said line directed outward from said guide element and routed through said keeper element.

2. The animal restraining apparatus according to claim 1, wherein said belt forms a loop.

3. The animal restraining apparatus according to claim 2, wherein said belt is adjustable to vary a size of said opening.

4. The animal restraining apparatus according to claim 3, wherein said belt has a hook-and-loop fastener.

5. The animal restraining apparatus according to claim 1, wherein in a fastened condition of said belt a peripheral length of said belt is variable.

6. The animal restraining apparatus according to claim 5, wherein said free end portions of said line are drawn apart from each other to decrease said peripheral length.

7. The animal restraining apparatus according to claim 1, wherein said guide element forms a channel between said guide element and said belt, and said line is routed through said channel.

8. The animal restraining apparatus according to claim 7, wherein said guide element is at least one of attached to and integrated with said belt.

9. The animal restraining apparatus according to claim 1, wherein said line comprises at least one of a rope, a cord, a band, a chain and a wire.

10. The animal restraining apparatus according to claim 1, wherein said line is slidable with respect to said belt.

11. The animal restraining apparatus according to claim 1, wherein said guide element is intermittently positioned along a periphery of said belt.

12. The animal restraining apparatus according to claim 1, wherein said keeper element comprises a ring attached with respect to said belt.

13. The animal restraining apparatus according to claim 12, wherein said line is overlapped near said ring.

14. The animal restraining apparatus according to claim 1, wherein said line is overlapped near said keeper element.

15. The animal restraining apparatus according to claim 1, wherein at least one of said free end portions is connected to a connector.

16. The animal restraining apparatus according to claim 1, wherein one of said free end portions is connected to a leash.

17. An animal restraining apparatus comprising:
   a collar positionable around a neck portion of an animal, a belt forming an opening, said belt positionable around a girth of the animal, a guide element connected with respect to said belt and forming a void between said belt and said guide element, a line movably mounted within said void, said guide element maintaining a position of said line with respect to said belt, a keeper element attached to said belt, opposite free end portions of said line directed outward from said guide element and routed through said keeper element, and said line overlapping itself near said keeper element.

18. An animal restraining apparatus comprising:
   a collar positionable around a neck portion of an animal, a line forming an opening, said line positionable around a girth of the animal, a guide element at least one of formed by and connected to a first end portion of said line, a second end portion of said line passing through said guide element, a keeper element at least one of formed by and connected to said second end portion of said line, and a second line having a first end portion connected with respect to said keeper element.

19. The animal restraining apparatus according to claim 18, wherein said collar is connected with respect to a second end portion of said second line.

* * * * *